(12) United States Patent
Smiley et al.

(10) Patent No.: US 7,938,220 B2
(45) Date of Patent: *May 10, 2011

(54) MATERIAL HANDLING VEHICLE WITH DUAL CONTROL HANDLE SYSTEM

(75) Inventors: Gregory W. Smiley, Greene, NY (US); Robert J. Lewis, Binghamton, NY (US); Kurt R. Werner, Auburn, NY (US); H. Scott Ryan, Skaneateles, NY (US)

(73) Assignee: The Raymond Corporation, Greene, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/644,664

(22) Filed: Dec. 22, 2009

(65) Prior Publication Data

US 2010/0096212 A1    Apr. 22, 2010

Related U.S. Application Data

(63) Continuation of application No. 12/240,301, filed on Sep. 29, 2008, now Pat. No. 7,658,259, which is a continuation of application No. 10/631,239, filed on Jul. 31, 2003, now Pat. No. 7,428,943.

(51) Int. Cl.
*B66F 9/06* (2006.01)
(52) U.S. Cl. .................. 180/321; 180/324; 187/222
(58) Field of Classification Search ............ 187/224, 187/222; 180/89.12, 315, 321–323, 333, 180/336
See application file for complete search history.

(56) References Cited

U.S. PATENT DOCUMENTS

| | | |
|---|---|---|
| 3,604,528 A | 9/1971 | Williamson |
| 3,750,834 A | 8/1973 | Luft |
| 3,937,294 A | 2/1976 | Haddock |
| 4,016,948 A | 4/1977 | Kuester |
| 4,141,591 A | 2/1979 | Spicer |
| 4,212,250 A | 7/1980 | Burgess |
| 4,318,451 A | 3/1982 | Liggett |
| 4,638,883 A | 1/1987 | Moriizumi et al. |
| 4,846,581 A | 7/1989 | Osterlund et al. |
| 5,190,118 A | 3/1993 | Yelton |
| 5,226,497 A | 7/1993 | Beaton |
| 5,285,867 A | 2/1994 | Pedersen et al. |
| 5,595,259 A | 1/1997 | Gilliland et al. |
| 6,015,019 A | 1/2000 | Grimes et al. |
| 6,182,778 B1 | 2/2001 | Henshaw et al. |
| 6,505,695 B2 | 1/2003 | Oshima et al. |
| 6,564,906 B1 | 5/2003 | Haack et al. |
| 6,679,349 B1 | 1/2004 | Pollish, Jr. |

OTHER PUBLICATIONS

BT Industries AB, product information disclosure, 3 pages "BT Reflex Compact Reach Truck with Narrow Chassis," Mjobly, Sweden.*

* cited by examiner

*Primary Examiner* — Ruth Ilan
(74) *Attorney, Agent, or Firm* — Quarles & Brady LLP

(57) ABSTRACT

A material handling vehicle includes an operator compartment having two operator control handles, a deadman switch accessible by an operator using either control handle, and a traction system. The traction system is controlled by the control handles to drive the vehicle in a selected direction, wherein an operator can control the traction system while facing one of the selected directions and the deadman switch is selectively activatable to enable operation from both control handles.

18 Claims, 5 Drawing Sheets

MATERIAL HANDLING VEHICLE WITH DUAL CONTROL HANDLE SYSTEM

CROSS-REFERENCE TO RELATED APPLICATION

This application is a continuation of U.S. patent application Ser. No. 12/240,301, filed Sep. 29, 2008, now U.S. Pat. No. 7,658,259 which is a continuation of U.S. patent application Ser. No. 10/631,239, filed Jul. 31, 2003, now U.S. Pat. No. 7,428,943 both of which are fully incorporated herein by reference.

STATEMENT CONCERNING FEDERALLY SPONSORED RESEARCH OR DEVELOPMENT

Not applicable.

BACKGROUND OF THE INVENTION

The present invention relates to material handling vehicles, and more particularly to a material handling vehicle with ergonomic multiple control handles for operation in a variety of operator orientations.

Material handling vehicles commonly found in warehouse and factory environments include, for example, vehicles in which the operator normally stands on a platform at the rear of the truck, at the end opposite of a load carrying or load handling mechanism, typically employing forks to lift and transport material. To provide an efficient flow of goods in such facilities, operators of these vehicles typically orient their bodies in the most comfortable position for adequate visibility to drive the material handling vehicles in both a forks first direction, with the vehicle forks leading in the direction of travel, and tractor first direction, in which the vehicle forks trail in the direction of travel.

Although in a typical vehicle there are a variety of possible operator orientations, when traveling, an operator will favor positions that maximize comfort and visibility for forks first and tractor first travel. Generally, one operator orientation is used more frequently than the others. The prevalent orientation varies with vehicle design, from facility to facility, within a given facility, and even from operator to operator. There is, therefore, a fundamental need to provide stability to the operator when traveling for all likely orientations, while maintaining operator comfort and the maximum productivity potential of the vehicle.

For these reasons, designers of lift trucks have developed a number of different operator compartment configurations. Available configurations include both standing and seated configurations in which the operator faces either generally to one side or to the front/rear of the truck. Vehicles designed for a standing operator (stand-up vehicles), include both side stance configurations where the operator generally operates the truck when standing facing the left side of the truck and, fore/aft configurations in which the operator may either stand facing the load or away from the load. For each of these configurations, designers have further provided various methods to accommodate operator stability for travel in both the forks first and tractor first directions, and to provide each design with a reasonable degree of comfort for the operator, while ensuring the capability for vehicle productivity. Stand-up vehicle designs, for example, typically impart stability, in part, through hand operated vehicle controls that provide both stability and the means to control the operation of the vehicle. Operator stability when traveling is accomplished through a combination of a solid footing, pads and covers that embrace portions of the operators body, hands on the vehicle controls and an operator advanced knowledge of the commanded vehicle motions.

Typical prior art stand-up vehicles utilize the same control elements to command travel in either direction and for either stance orientation. That is, the truck operator manipulates the same steering device, travel control, and deadman foot control regardless of stance orientation. In the case of stand-up trucks configured in the fore/aft sense, although designed to be intuitive for bi-directional control, some operators nonetheless find the controls more convenient for forks first travel than for tractor first travel. Furthermore, these controls often do not provide maximum comfort for the widest possible range of operator sizes, as the operator must reach beside and slightly rearward of his or her centerline in order to control the vehicle travel speed when driving and facing in the tractor first direction.

SUMMARY OF THE INVENTION

In one aspect, the present invention provides a material handling vehicle including an operator compartment having two operator control handles, a deadman switch accessible by an operator using either control handle, and a traction system. The traction system is controlled by the control handles to drive the lift truck in a selected direction, wherein an operator can control the traction system while facing the selected direction and the deadman switch is selectively activatable to enable operation from both control handles.

In another aspect of the invention, an operator compartment for a material handling vehicle is provided. The operator compartment includes two control handles, a first control handle mounted for access by an operator facing a first direction, and an second control handle mounted for access by an operator facing a second direction. A deadman switch and a steering wheel are each positioned in the compartment to be accessible by an operator using either control handle.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

DETAILED DESCRIPTION OF THE PREFERRED EMBODIMENT

Figure 1:
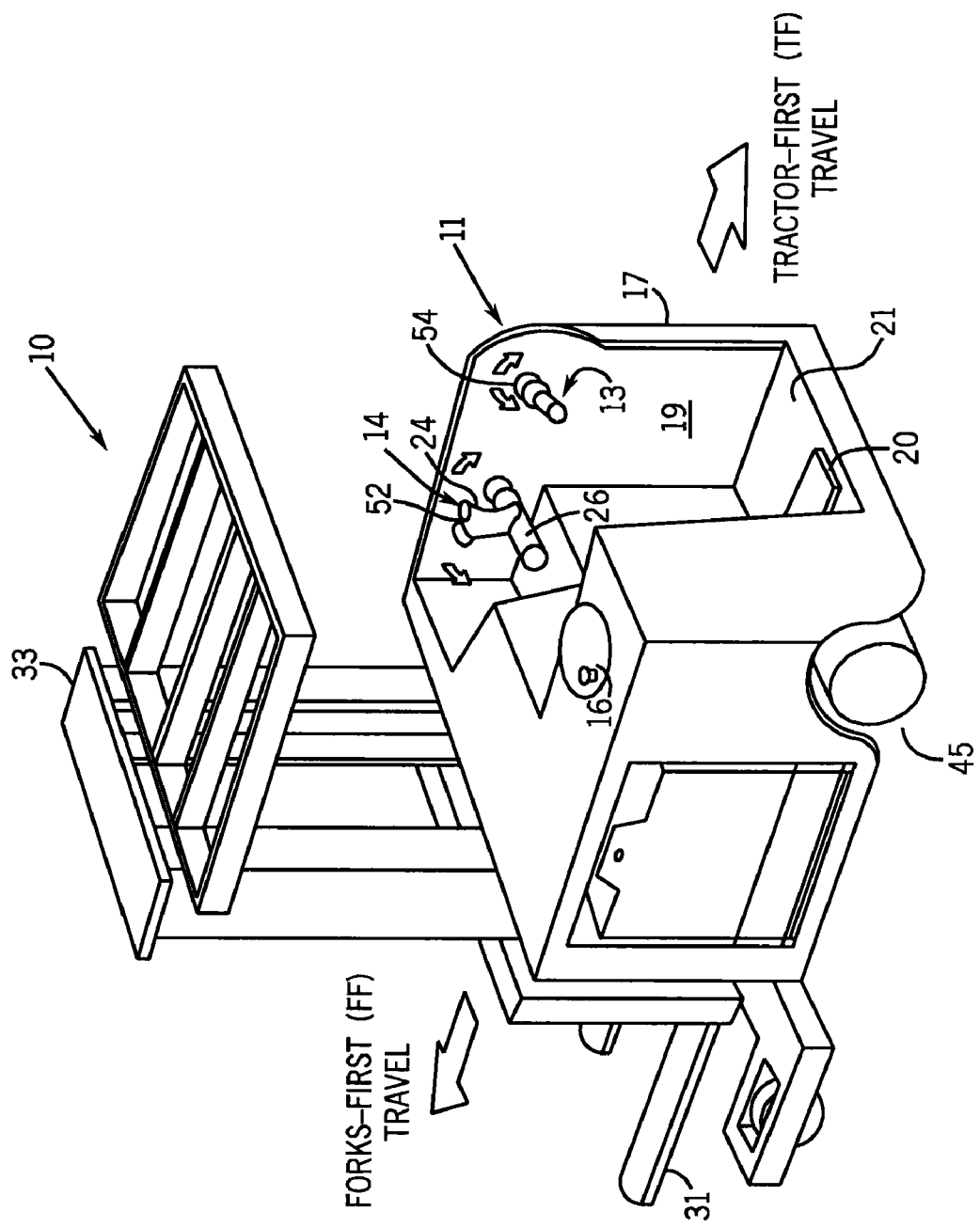
FIG. 1 is a top view of a material handling vehicle constructed in accordance with the present invention with the operator facing aft.

Referring now to the Figures, and more particularly to FIG. 1, a material handling vehicle constructed in accordance with the present invention is shown. The material handling vehicle as shown is a stand-up, fore-aft stance configured lift truck 10 designed to allow the operator to stand facing in the direction of travel, whether travel be in the Forks First or Tractor First direction. The truck 10 includes an operator compartment 11 comprising an enclosure 17 with an opening 19 for entry and exit of the operator.

The compartment 11 includes a first multi-function control handle 14 which is mounted to the enclosure 17 at the front of the operator compartment 11 proximate the forks 31, an aft control handle 13 positioned at the back of the compartment 11, and a floor switch 20 positioned on the floor 21 of the compartment 11 in a location selected to allow the operator to easily access the floor switch 20 when facing either the fore or aft direction. A steering wheel 16 is also provided in the compartment 11 and, like the floor switch, is positioned to allow control by the operator when facing either the fore or aft directions. The position of multi-function control handle 14 is selected to control the speed and direction of travel of the lift truck 10 when the operator is facing the forks 31, and the aft control handle 13 is positioned to control the motion of the lift truck 10 when the operator is facing in the aft-facing direction, as described more fully below.

Figure 2:
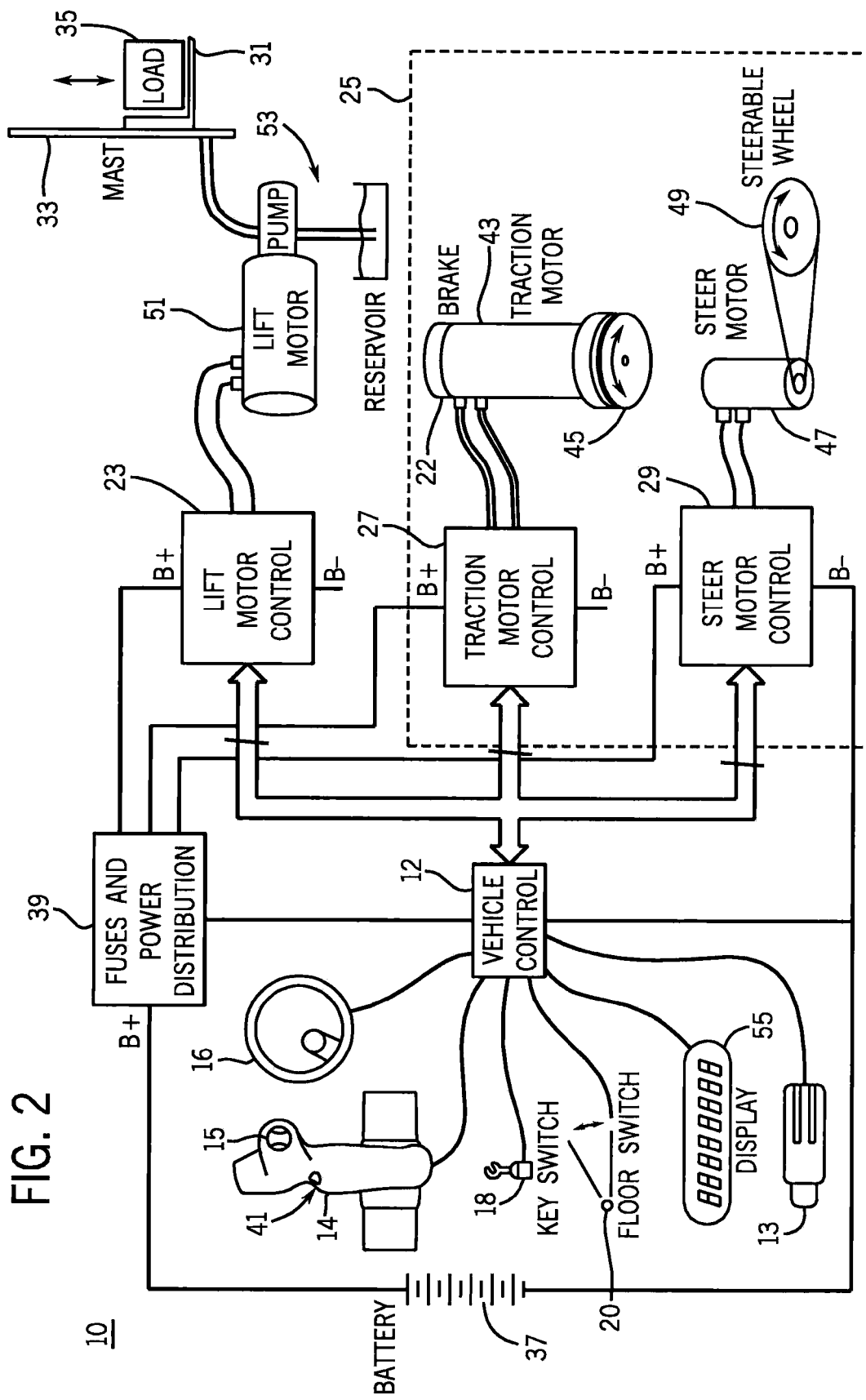
FIG. 2 is a block diagram of the lift truck constructed in accordance with the present invention.

Referring now to FIG. 2, a block diagram of a typical lift truck 10 in which the present invention can be provided is illustrated. The lift truck 10 comprises a vehicle control system 12 which receives operator input signals from the aft control handle 13, the multi-function control handle 14, the steering wheel 16, a key switch 18, and the floor switch 20 and, based on the received signals, provides command signals to each of a lift motor control 23 and a drive system 25 including both a traction motor control 27 and a steer motor control 29. The drive system 25 provides a motive force for driving and steering the lift truck 10 in a selected direction, while the lift motor control 23 drives forks 31 along a mast 33 to raise or lower a load 35, as described below. The lift truck 10 and vehicle control system 12 are powered by one or more battery 37, coupled to the vehicle control system 12, drive system 25 and lift motor control 23 through a bank of fuses or circuit breakers 39.

As noted above the operator inputs include a key switch 18, floor switch 20, steering wheel 16, a multi-function control handle 14, and an aft control handle 13. The key switch 18 is activated to apply power to the vehicle control system 12, thereby enabling the lift truck 10. The floor switch 20 provides a deadman braking device, disabling motion of the vehicle unless the floor switch 20 is activated by the operator, as described below.

Figure 3:
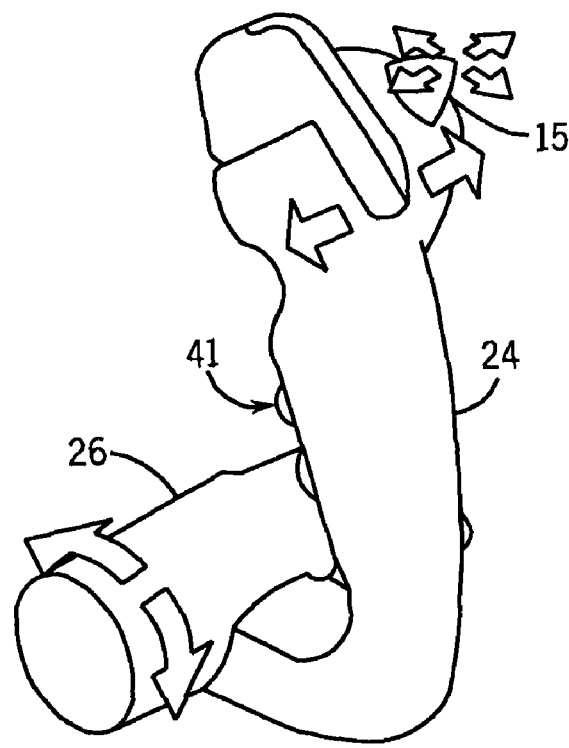
FIG. 3 is a perspective view of a multi-function control handle of FIGS. 1 and 2.

Referring now also to FIGS. 1 and 3, the control handle 14 is a multi-function control which includes both an upright, substantially vertical section 24, and a horizontal section 26, the vertical 24 and horizontal 26 sections together providing a number of control functions for the lift truck 10. The horizontal section 26 includes a transducer such as a potentiometer which provides a travel direction and speed command signal to the lift truck 10 and is configured to provide intuitive control for an operator facing the fore of the lift truck 10 or the forks first direction. The horizontal section 26 is rotated forward towards the forks 31 of the lift truck 10 to provide a forks first directional and speed command and backwards away from the forks 31 to provide a tractor first directional and speed signal to the vehicle control 12, the final speed of travel being determined in both cases based on the degree of rotation. The vertical section 24 includes a four-way switch 15 located on the top of the control handle 14 which provides a tilt up/down function when activated in the forward and reverse directions and a sideshift right and left function when activated to the right and left directions. A plurality of control actuators 41 located on the vertical section of the control handle 14 provide a number of additional functions, and can include, for example, a reach push button, a retract push button, and a horn push button. The vertical sectional portion further includes a transducer such as a potentiometer providing a lift function control signal to the vehicle control system 12. A number of other functions could also be provided, depending on the construction and intended use of the lift truck 10.

Figure 4:
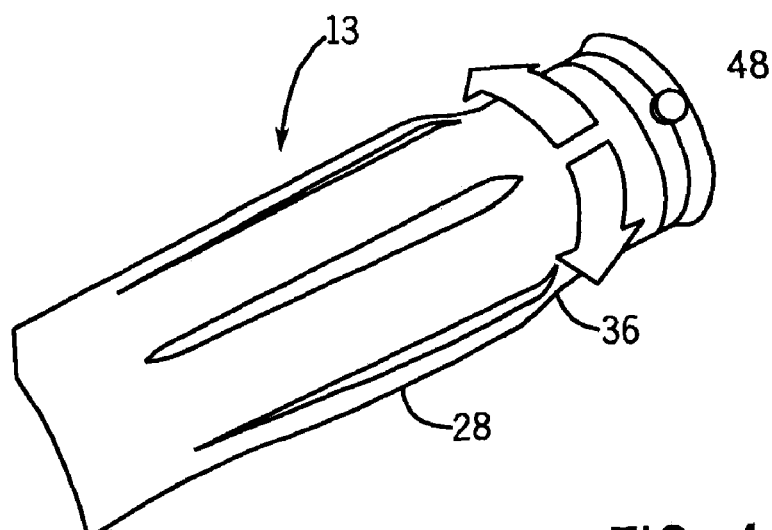
FIG. 4 is a perspective view of an aft control handle of FIGS. 1 and 2.

Referring now to FIGS. 1, 2, and 4, the aft control handle 13 is a horizontally mounted handle which provides directional and speed control signals to the vehicle control system 12 as described with reference to the horizontal section of the control handle 14 described above. The aft control handle 13 is configured to operate intuitively, and similarly to the control handle 14, for an operator facing the aft of the vehicle. The aft control handle 13 is rotated forward toward the aft of the lift truck 10 to provide a tractor first directional signal and speed command, and in the opposite direction, toward the fore of the lift truck 10, to provide a forks first directional signal and speed command. Therefore, irrespective of the direction that the operator is facing, a control handle with intuitive operation is provided. When facing either direction, a control is provided which is rotatable in the direction that the operator is facing to cause the lift truck 10 to move in that direction, and which is also rotatable in the opposite direction to cause the lift truck 10 to move in the opposite direction. As described above, the speed request signal provided by the aft control handle 13 is a function of the amount of rotation in a given direction.

Referring again to FIG. 2, as shown, the vehicle control system 12 receives a control signal from at least one of the control handle 14 and aft control handle 13 and transmits the control signal to traction motor control 27. Traction motor control 27 activates the traction motor 43 which is connected to wheel 45 to provide motive force to the lift truck 10. The speed and direction of the traction motor 43 and associated wheel is selected by the operator from the control handles 13 and 14, and is typically monitored and controlled through an encoder or other feedback device (not shown) coupled to the traction motor 43. As shown, each of the control handles 13 and 14 provide an individual control signal to the vehicle control system 12 and traction control system 27. In this case, the vehicle control system 12 evaluates the signals provided by each of the control handles 13 and 14 and determines an appropriate speed and direction of travel. Alternatively, the control handles 13 and 14 could be mechanically linked, with either one of the control handles providing a control signal to the vehicle control system 12. In other embodiments, the control handles 13 and 14 can be selectively activated using mechanical or electrical switch devices, activated or deactivated through user interfaces such as the display 55 described below, or otherwise regulated.

The wheel 45 is also connected to friction brake 22 through the drive motor, providing both a service and parking brake function for the lift truck 10. The friction brake 22 is typically spring applied, and defaults to a "brake on" position. The operator must stand on the deadman pedal, actuating floor switch 20, for the brake to be released. The traction motor 43 is typically an electric motor, and the associated friction brakes 22 can be either an electrically or a hydraulically released devices. Although one friction brake 22, motor 43, and wheel 45 are shown, the lift truck 10 can include one or more of these elements.

The steer motor control 29 is connected to drive a steer motor 47 and associated steerable wheel 49, steered in a direction selected by the operator by rotating the steering wheel 16, described above. The direction of rotation of the steerable wheel 49 determines the direction of motion of the lift truck.

The lift motor control 23 provides command signals to control a lift motor 51 which is connected to a hydraulic circuit 53 for driving the forks 31 along the mast 33, thereby moving the load 35 up or down, depending on the direction selected at the multi-function control handle 14. In some applications, the mast 33 can be a telescoping mast. Here, additional hydraulic circuitry can be included to raise or lower the mast 33 as well as the forks 31.

In addition to providing control signals to the drive system and lift control system, the vehicle control 12 can also supply data to a display 55 for providing information to the operator. Displayed information can include, for example, a weight of a load placed on the forks 31, the speed of the vehicle, the time of day, or the state of charge of the battery.

Referring now to FIGS. 1 and 4, as described above, the aft control handle 13 is horizontally mounted and is preferably provided as a cylindrically-shaped, twist grip style handle. The twist grip handle is advantageous because it is relatively small and provides a full range of motion in limited space and, further, provides stability to the operator as the lift truck 10 is in motion. The center core of the aft control handle 13 can be mounted directly to a frame of the lift truck 10, and the outer grip 28 responds to rotational forces about the center axis of the aft control handle 13, remaining stationary relative to arm movements and forces up, down, left, right, toward and away from the operator. The aft control handle 13 is preferably mounted at a height of about thirty-eight inches above the floor 21, and angled front to back (FIG. 1) at an angle of about seventy degrees to the adjacent side wall of operator compartment 11. At this height and angle, the aft control handle 13 has been shown to fit comfortably in an operator's hand at a neutral hand position, and further to be substantially perpendicular to the axis of the operator's arm in use, providing a comfortable grip for operators varying in height between the bottom 5 percent of females and the top 95 percent of males, therefore providing an ergonomic control for virtually all operators. Preferably, the outer grip 28 is a smooth material molded to include recessed grooves 30, which provide a positive, comfortable grip. Although a number of suitable materials are available, one material useful in this application is 10% glass filled polycarbonate thermoplastic. The smooth material grip 28 and recessed grooves 30 are selected to provide a positive yet comfortable grip, and allow for easy movement of the grip around the handle. Referring still to FIG. 4, control handle 13 also includes horn push button 48 allowing an aft-facing operator to sound a warning without removing his or her hand from the handle.

Figure 6:
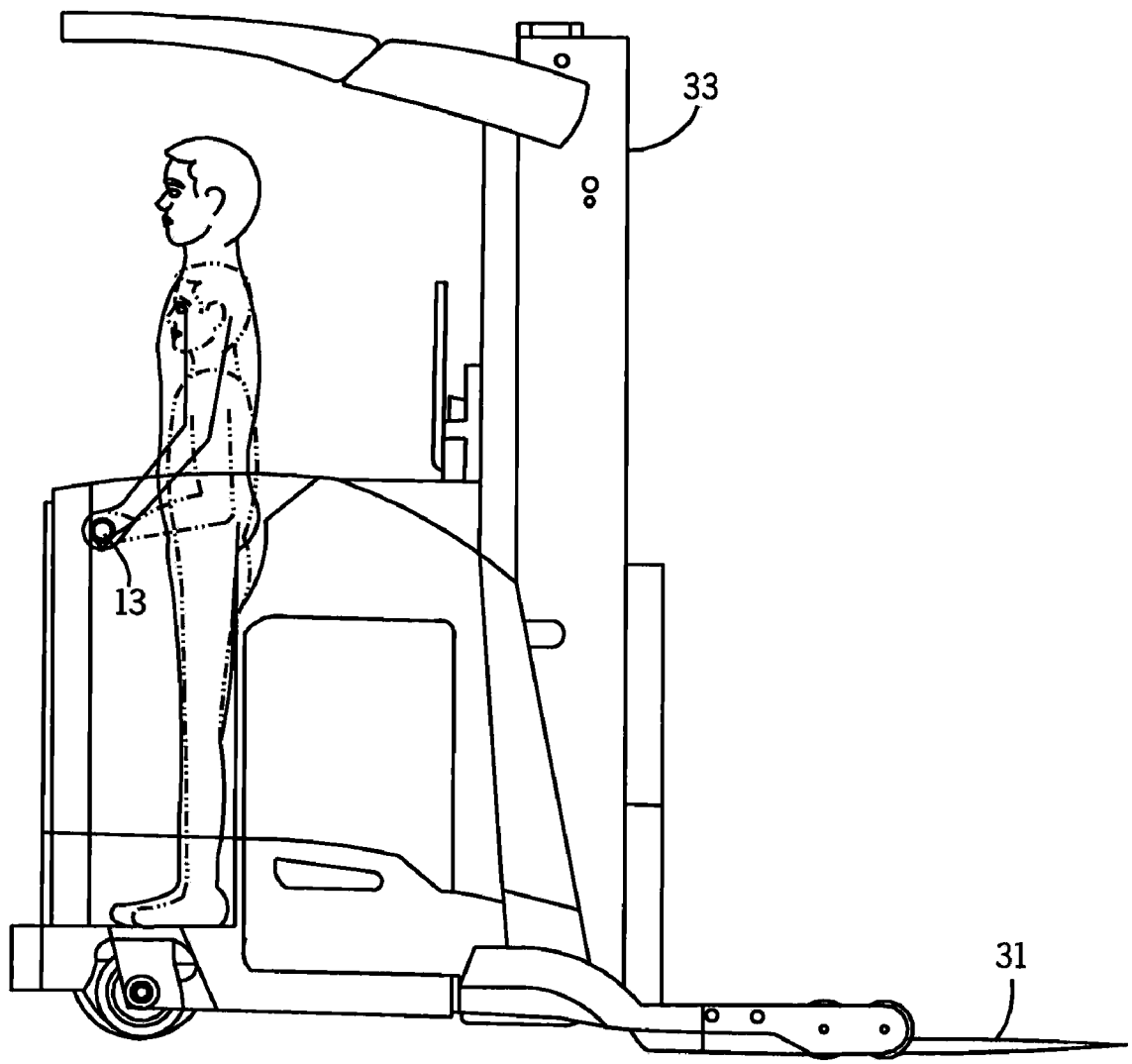
FIG. 6 is a cutaway side view of the material handling vehicle of FIG. 1, showing an operator using the aft control handle.

Referring now to FIG. 6, a side view of the lift truck 10 showing an operator facing aft is shown. In this position, the operator grips the aft control handle 13, such that the operator is facing in the direction of motion. The shape and position of the aft control handle 13 allow individuals of various heights to grip the aft control handle 13 from a variety of approach angles and grip positions. As described above, operation of the handle is simple and intuitive, allowing rotation in the direction of travel when the operator is facing aft, as shown.

Figure 5:
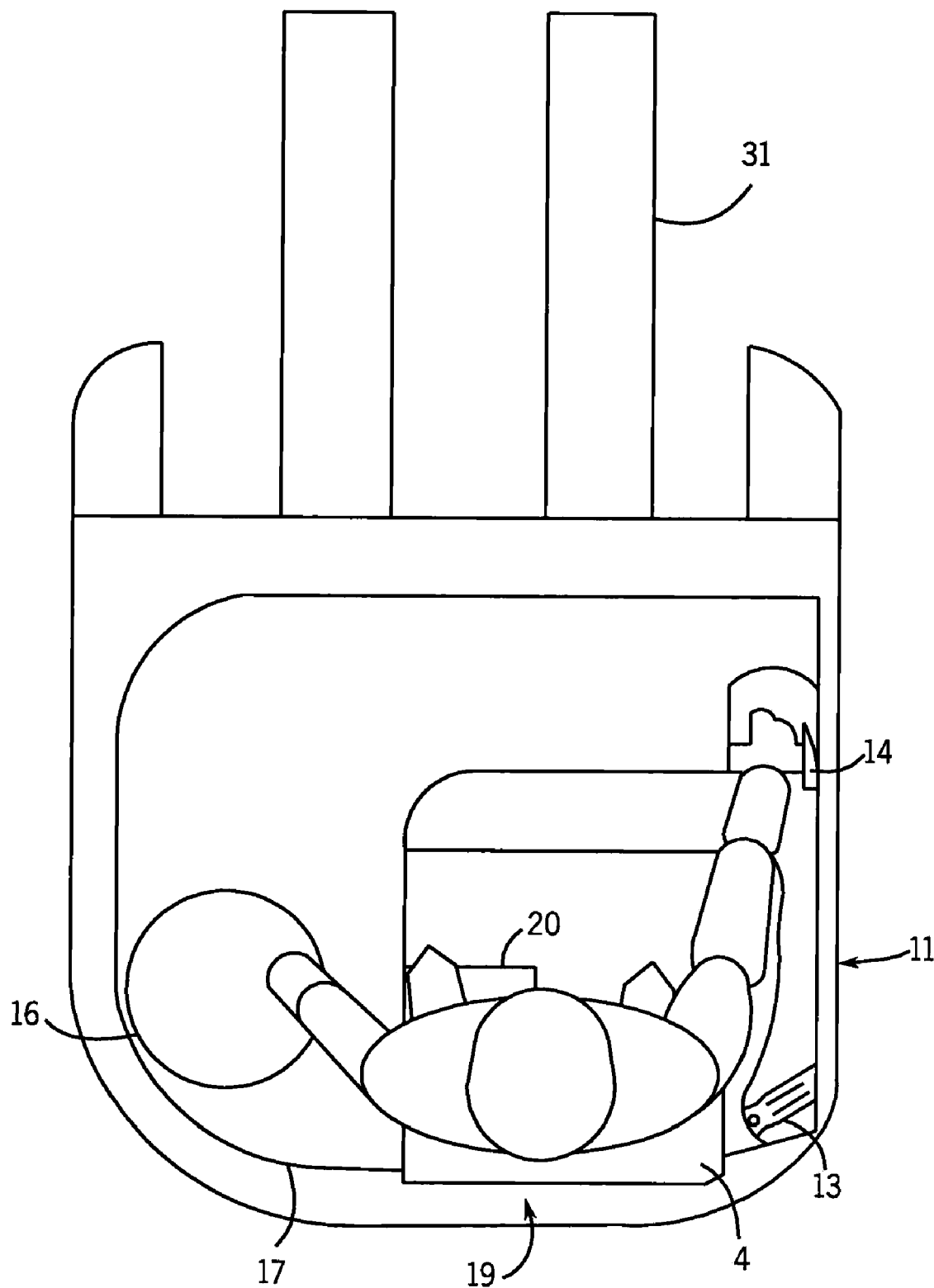
FIG. 5 is a top view of the material handling vehicle with the operator facing fore.

Referring now to FIGS. 1, 5, and 6, in operation, the operator stands in the operator compartment 11 selectively facing either the fore, forks first direction (FIG. 5), or the aft, tractor first direction (FIGS. 1, 6). When operating the lift truck in the forks first direction, the operator controls the direction and speed of motion using the multifunction control handle 14, as described above. The deadman switch 20 provided on the floor of the operator compartment 11 is positioned to be activated or deactivated by the left foot, and the steering wheel 16 is, likewise, operated by the left hand when the lift truck is operated in the forks first mode.

Referring now to FIGS. 1 and 6, while facing the aft direction of the lift truck and particularly for operating the lift truck in the aft or tractor first direction, the operator controls the direction and speed of travel of the lift truck with his or her left hand using the aft control handle 13, and operates the floor switch 20 and steering wheel 16 with the right foot and hand respectively. While facing either the fore or aft directions, therefore, the operator can control the speed and direction of the lift truck 10 with an operator control handle which is positioned to the side and ahead of the operator's centerline. This arrangement provides improved ease of control, and further provides stability for the operator, allowing the operator to grip a control in the direction the operator is facing. Furthermore, as the operator is not required to reach beside and slightly rearward of his or her centerline when facing in the aft direction to control travel of the lift truck, the operation is more comfortable, which is not only advantageous for the operator, but improves the overall productivity potential of the lift truck by decreasing the need for operator breaks during operation.

Although it is advantageous for the operator to control the travel of lift truck 10 with the multi-function control handle 14 when facing the forks and traveling in the forks first direction and the aft control handle 13 when facing the aft and traveling in the tractor first direction, either control handle 13 or 14 can be used to control the direction and speed of the lift truck in either direction. Typically, however, an operator will elect to control the lift truck with the aft control handle 13 when the lift truck 10 is operated for an extended period of time traveling in the tractor first direction and with the control handle 14 when operating for an extended period of travel in the forks first direction and when operating the load handling controls included on multi-function control handle 14.

Although the invention has been described with respect to a stand-up, fore-aft configuration lift truck, it will be apparent that the techniques disclosed can be applied to side-stance and seated-operator trucks as well, and nothing disclosed herein should be construed to limit the teaching of the invention to stand-up, fore-aft configuration trucks. Furthermore, while the invention has been described with reference to a lift truck, the invention could be applied to various other types of material handling vehicles.

While there has been shown and described what are at present considered the preferred embodiments of the invention, it will be obvious to those skilled in the art that various changes and modifications can be made therein without departing from the scope of the invention defined by the appended claims.

We claim:

1. A material handling vehicle, comprising:
   an operator compartment;
   a first operator control handle for selecting a direction and a speed of vehicle travel, the first control handle being mounted in the operator compartment and configured for operation in a first vehicle direction;
   a second operator control handle for selecting a direction and a speed of vehicle travel, the second operator control handle mounted in the compartment and configured for operation in a second vehicle direction;
   a deadman switch in a position accessible by an operator operating the vehicle using at least one of the first control handle and the second control handle, the deadman switch being selectively activatable to enable operation from both the first operator control handle and the second operator control handle; and a traction system controlled by the first and second operator control handles to selectively drive the vehicle in the first vehicle direction and the second vehicle direction, wherein an operator can control the traction system while facing one of the first vehicle direction and the second vehicle direction.

2. The material handling vehicle as defined in claim 1, wherein the first operator control handle is a multi-function control handle.

3. The material handling vehicle as defined in claim 1, wherein the first operator control is mounted at a first end of the operator compartment.

4. The material handling vehicle as defined in claim 3, wherein the second operator control handle is mounted to a second end of the operator compartment.

5. The material handling vehicle as defined in claim 1, wherein the first operator control handle is movable about an axis and said second operator control handle is movable about an axis.

6. The material handling vehicle as defined in claim 5, in which axis about which the first operator control handle is movable and the axis about which the second operator control handle is movable are not coaxial.

7. The material handling vehicle as defined in claim 6, in which one of said operator control handles includes a vertical section.

8. The material handling vehicle as defined in claim 1, further comprising a floor in the compartment, and the deadman switch is mounted to the floor.

9. The material handling vehicle as defined in claim 1, wherein the second operator control is mounted at an angle as referenced to a side of the compartment selected to be substantially perpendicular of an arm of the operator when operating the second operator control.

10. The material handling vehicle as defined in claim 1, including a steering wheel mounted to the compartment, the steering wheel being positioned on the compartment in a location to allow an operator to rotate the steering wheel when using either the first control handle or the second control handle.

11. The material handling vehicle as defined in claim 1, wherein the second operator control handle includes a horn actuator for activating a horn.

12. An operator compartment for a material handling vehicle comprising:

a first control handle mounted for access by an operator facing a first direction, said first control handle being movable about an axis;

a second control handle mounted for access by an operator facing a second direction, the second control handle being movable about an axis;

a deadman switch accessible by an operator using the first control handle when facing the first direction and the second control handle when facing the second direction; and a steering wheel accessible by an operator using the first control handle when facing the first direction and accessible by an operator using the second control handle when facing the second direction.

13. The material handling vehicle of claim 12, wherein the first and second vehicle directions are fore and aft directions of the vehicle.

14. The material handling vehicle of claim 12 wherein the second control handle is substantially horizontal.

15. The material handling vehicle as defined in claim 12, in which axis about which the first operator control handle is movable and the axis about which the second operator control handle is movable are not coaxial.

16. The material handling vehicle as defined in claim 12, wherein the first and second control handles are each movable around a substantially horizontal axis.

17. The material handling vehicle as defined in claim 12, wherein each of the first and second control handles are movable in the second and first directions, respectively, to provide a control signal indicative of motion in the direction opposite the direction the operator is facing.

18. The material handling vehicle as defined in claim 12, wherein the second control handle is a twist grip handle.

* * * * *